March 7, 1967     D. E. WEGLAGE ET AL     3,307,527
COMPRESSION RELEASE FOR INTERNAL COMBUSTION ENGINES
Filed Aug. 16, 1965     7 Sheets-Sheet 1

INVENTORS
DAVID E. WEGLAGE
ALBERT A. WEGLAGE
BY

INVENTOR.
ALBERT A. WEGLAGE
DAVID E. WEGLAGE

United States Patent Office 3,307,527
Patented Mar. 7, 1967

3,307,527
COMPRESSION RELEASE FOR INTERNAL COMBUSTION ENGINES
David E. Weglage and Albert A. Weglage, Dayton, Ohio, assignors of one-third to Walter Becker
Filed Aug. 16, 1965, Ser. No. 480,086
20 Claims. (Cl. 123—182)

The present invention is a continuation-in-part application of our copending patent applications Ser. No. 299,-602, filed August 2, 1963 and Ser. No. 352,385 filed March 16, 1964 now abandoned, and relates to internal combustion engines and, more specifically, concerns the manual starting of internal combustion engines.

The manual starting of internal combustion engines, particularly those used in connection with garden and horticultural implements such as lawn mowers, snow blowers, pumps, and the like has been quite some problem and various attempts have been made to facilitate the manual starting of such engines.

Thus, to ease the manual starting of valve equipped internal combustion engines, one of the cams of the cam shaft which normally control the inlet and outlet valves, has its profile re-shaped so as to delay the final closure of the respective valve during the compression stroke of the engine. While this arrangement has facilitated the starting of a correspondingly designed engine, it has the drawback that it is operative throughout the entire running period of the engine and thus actually interferes with the otherwise possible top performance of the engine design. Furthermore, this arrangement does not, during the manual starting operation, release the compression to the desired extent because the modified cam-controlled valve closes and must close before the end of the compression stroke of the engine, since otherwise, no economically feasible operation of the engine during its normal running period would be possible.

It is, therefore, an object of the present invention to provide compression release means for facilitating the manual starting of an internal combustion engine, which will overcome the above-mentioned drawbacks.

It is another object of this invention to provide compression release means for a four-stroke-cycle internal combustion engine, which will be operative during the starting of the engine only and will not affect the normal operation of the engine.

It is still another object of this invention to provide compression release means for four-stroke-cycle internal combustion engines which will be independent of the cam shaft of the engine.

It is still another object of this invention to provide compression release means for four-stroke-cycle internal combustion engines which will be effective automatically when the engine is to be started and will become automatically ineffective as soon as the engine has started.

It is a still further object of this invention to provide compression release means as set forth above which will automatically return to its ineffective or compression releasing position when the engine is coming to a standstill.

These and other objects and advantages of the invention will appear more clearly from the following specification in connection with the accompanying drawings, in which:

FIGURE 12a is a section along the line XIIa—XIIa of FIGURE 12;

General arrangement

The compression release mechanism according to the present invention makes use of the well known fact that with an internal combustion engine of the reciprocable piston type which has a crank-case and a chamber such as the spring chamber in communication with the crank-case through a bore, a substantially continuous gaseous flow passes during the operation of the engine from the crank-case to said chamber, while means are provided for venting said chamber. It has been found according to the present invention that the said gaseous flow can be made use of for actuating control lever means which, in turn, can hold one of the valves, preferably the exhaust valve, open to a desired extent for at least a portion of the initial starting phase of the engine to thereby permit starting of the engine with the compression released.

Based on this finding according to the present invention, the compression release mechanism of the present invention consists primarily of a lever arranged in the spring chamber and provided with one lever arm having a portion in the path of the said gaseous flow from the crank-case into the spring chamber, while another arm of the lever directly or indirectly acts upon the respective valve so as to hold the same open in a compression releasing position during the initial phase of the starting operation.

Referring more specifically to the drawings, these drawings show an internal combustion engine which comprises a cylinder block 1 with a cylinder 1a. Mounted on cyinder block 1, in customary manner, is a cylinder head 1b. Cylinder block 1 comprises a spring chamber 2 which has connected thereto a housing or crankcase 3. Journalled in said housing 3 is a cam shaft 4 which is drivingly connected to the crank-shaft 4a of the engine in a manner customary with four-stroke-cycle internal combustion engines through gears. Crank-shaft 4a is likewise in customary manner connected through a connecting rod R with a piston P which is reciprocable in cylinder 1a.

Likewise in custmoary manner, cam shaft 4 is provided with a first cam 5 and a second cam 6. Cam 5 normally, i.e. during ordinary driving operation of the engine, is in continuous engagement with a lifter 7 having a lifter shank 7a which in turn engages the stem 8 of the exhaust valve 9 controlling the connection of the engine cylinder with an exhaust port (not shown) through a passage 1c.

Figures 1, 26, 27, 28, 32:
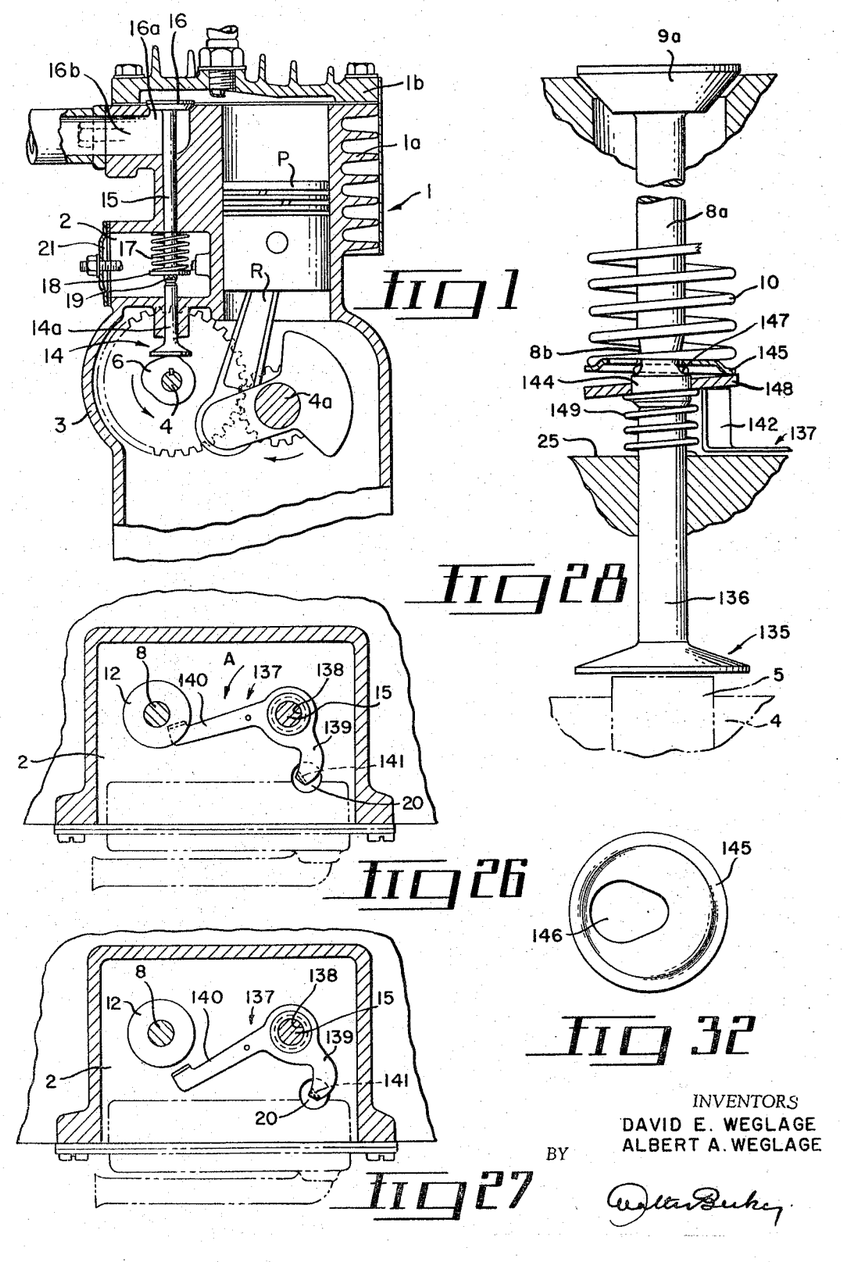
FIGURE 1 is a vertical section through a customary one-cylinder, four-stroke-cycle internal combustion engine as it is used for various purposes, for instance for horticultural equipment and may be equipped with a compression release arrangement according to the present invention.
FIGURE 26 is a section along the line XXVI—XXVI of FIGURE 23.
FIGURE 27 is a section similar to that of FIGURE 26 but showing the control lever in its ineffective position.
FIGURE 28 shows the control lever of FIGURES 23 to 27 in cooperation with a valve shank differing from the valve shank in FIGS. 13 and 23 in that it has an undercut section for receiving the spring dish or spring keeper.
FIGURE 32 shows a spring keeper of a special and well-known type for use in connection with the present invention.
Figure 1A:
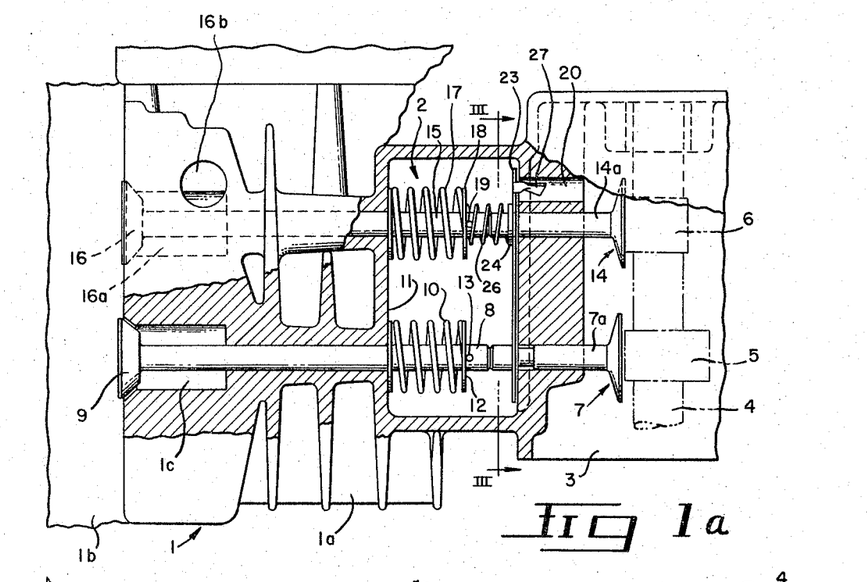
FIGURE 1a illustrates on a larger scale than FIG. 1, partly in view and partly in section, a portion of the cylinder block, cylinder head, and crankcase of the engine of FIGURE 1 and also shows the inlet valve in closed position and the outlet valve partially opened by a compression release mechanism according to the present invention.
Figure 5:
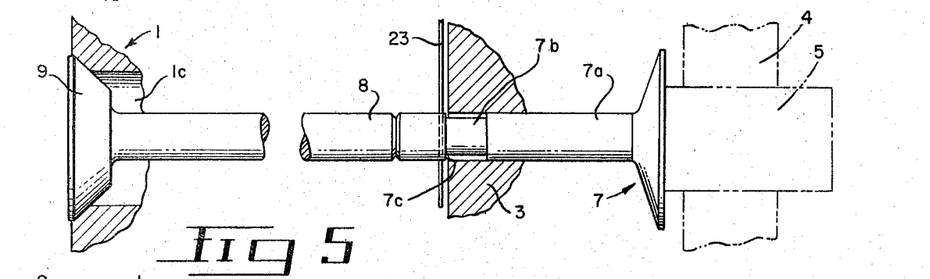
FIGURE 5 represents a section similar to that of FIGURE 2 but with the compression release lever in an ineffective position and with the valve controlled thereby in closed position.
Figure 6:
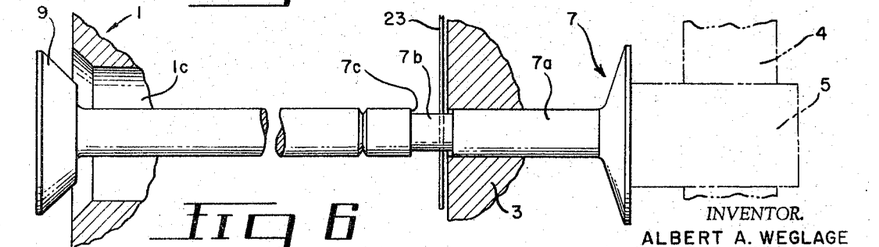
FIGURE 6 is a view similar to that of FIGURE 5 but with the compression release lever controlled valve in its fully opened position and with the compression release lever likewise in its ineffective position.

As will be seen from FIG. 1a, that portion of valve stem 8 which extends into spring chamber 2 is surrounded by a valve spring 10 having one end resting against the spring wall chamber 11. The other end of spring 10 rests against a spring keeper 12 holding spring 10 under pre-load and being held in its position on one hand by a pin 13 extending through shaft 8, and on the other hand by the said spring 10. As will be evident from the above, spring 10 continuously urges valve 9 into its closing position, shown in FIG. 5.

Cylinder block 1 furthermore, in customary manner, comprises a lifter 14 controlled by cam 6 on cam shaft 4. Cam 6 in turn through lifter shank 14a and valve shank 15 controls inlet valve 16 which latter controls a passage 16a communicating with a fuel supply passage 16b. Similar to the outlet valve 9, also the inlet valve 16 likewise located within the spring chamber 2 is provided with a spring 17, a spring keeper 18, and a pin 19 holding spring 17 under pre-load, said spring 17 continuously urging inlet valve 16 into closing position.

In conformity with the standard design of four-stroke-cycle internal combustion engines employed for agricultural and horticultural implements such as lawn mowers, the spring chamber 2 communicates with the interior of the housing or crank-case 3 through a passage 20 through which air customarily pumped into the crank-case by the reciprocating action of the engine piston is pumped into the spring chamber 2.

While the diameter of said passage 20 may vary with various designs, in conformity with the requirement for releasing the air pumped by piston P through crank-case 3 and passage 20 into the spring chamber and from there through a breather 21 (see FIGS. 1, 3, 4 and 12) into the atmosphere, it is to be noted that no change in the diameter of the piston and the said passage 20 of the standard engine is necessary for the present invention, and that this will not change the principle of the present invention. As a matter of fact, it is very easy to equip any standard four-stroke-cycle internal combustion engine later with a pressure release according to the present invention regardless of the size of the piston and the passage.

With further reference to the drawing, the air pumped into the spring chamber is released therefrom through a standard breather in a closing lid 22 into the atmosphere. Such standard breathers have been employed in connection with lawn mower engines for many years prior to the present invention and are well known in the art. The priciple of said breather is illustrated diagrammatically in FIG. 12. Such breather consists primarily of a housing 100 having an opening 101a in its front wall 101. Behind said opening there is a breather plate 102 which is floatingly arranged between the side walls 101b, 101c of the housing 100 and the front wall 101 and a retainer wall 103. Said retainer wall 103 extends from one side of the housing to the other side thereof but the retainer wall 103 is, at the bottom portion, somewhat narrower than the width of the housing, as is clearly shown in FIG. 12a so that the air which passes through opening 101a can escape through the bottom portion into the lower portion of housing 100. The lower portion of housing 100 has arranged therein ae wire mesh 105 which acts as a filter for catching the oil which may be drawn into the chamber 104 above the wire mesh 105. The entrapped oil will be released back to the crank-case through an opening 106. The rear wall of the housing 21 has an opening 107 to which is connected a tubing 108. Thus, the air passing through opening 101a into the chamber housing the floating disc 102 can escape from the bottom of this chamber through the wire mesh into the chamber 104 and from there through bore 107 and tubing 108 into the atmosphere. Preferably, the retainer wall 103 is, opposite the opening 107, provided with a narrow bore 103a.

The arrangement described so far is substantially standard with four-stroke-cycle engines as they are employed, for instance, with rotary lawn mowers.

On the basis of numerous tests, we have discovered that the abovementioned gaseous flow from the crankcase 3 into the spring chamber 2 which has heretofore been discharged into the atmosphere as useless, ideally lends itself to the automatic control of a compression release arrangement.

More specifically, according to one embodiment of the invention which has proved particularly successful, lifter shank 7a (FIGS. 1 and 5) is provided with a reduced diameter section 7b thereby creating a collar surface 7c adapted to be engaged and disengaged by a compression release control lever 23. The length of said reduced diameter section 7b is in excess of the maximum possible stroke of the valve 9 plus the thickness of the compression release control lever 23. This compression release control lever 23, henceforth briefly called "control lever," is provided with a bore 23a (FIG. 9) by means of which it is tiltably journalled about lifter shank 14a of lifter 14. Preferably, control lever 23 is not directly journalled on lifter shank 14a but instead is journalled on a ring member 24 (also see FIG. 10) having an outwardly extending flange 24a and a neck 24b. This ring member 24 is slipped over lifter shank 14a and has its neck 24b extending through bore 23a of control lever 23. The length of the neck 24b is slightly longer, for instance, by about .015" than the thickness of control lever 23 so that control lever 23 can freely swing about the outer peripheral surface 24c of neck 24b. In order to hold ring member 24 against the adjacent wall 25 of crankcase 3, there is provided a relatively weak spring 26 one end of which rests against flange 24a whereas the other end of spring 26 rests against spring keeper 18. In order to reduce the friction of control lever 23 with the adjacent wall 25 to a minimum, the control lever may, if desired, be provided with slight indentations 23c.

Figures 7, 8, 9, 10, 11, 12, 12D:
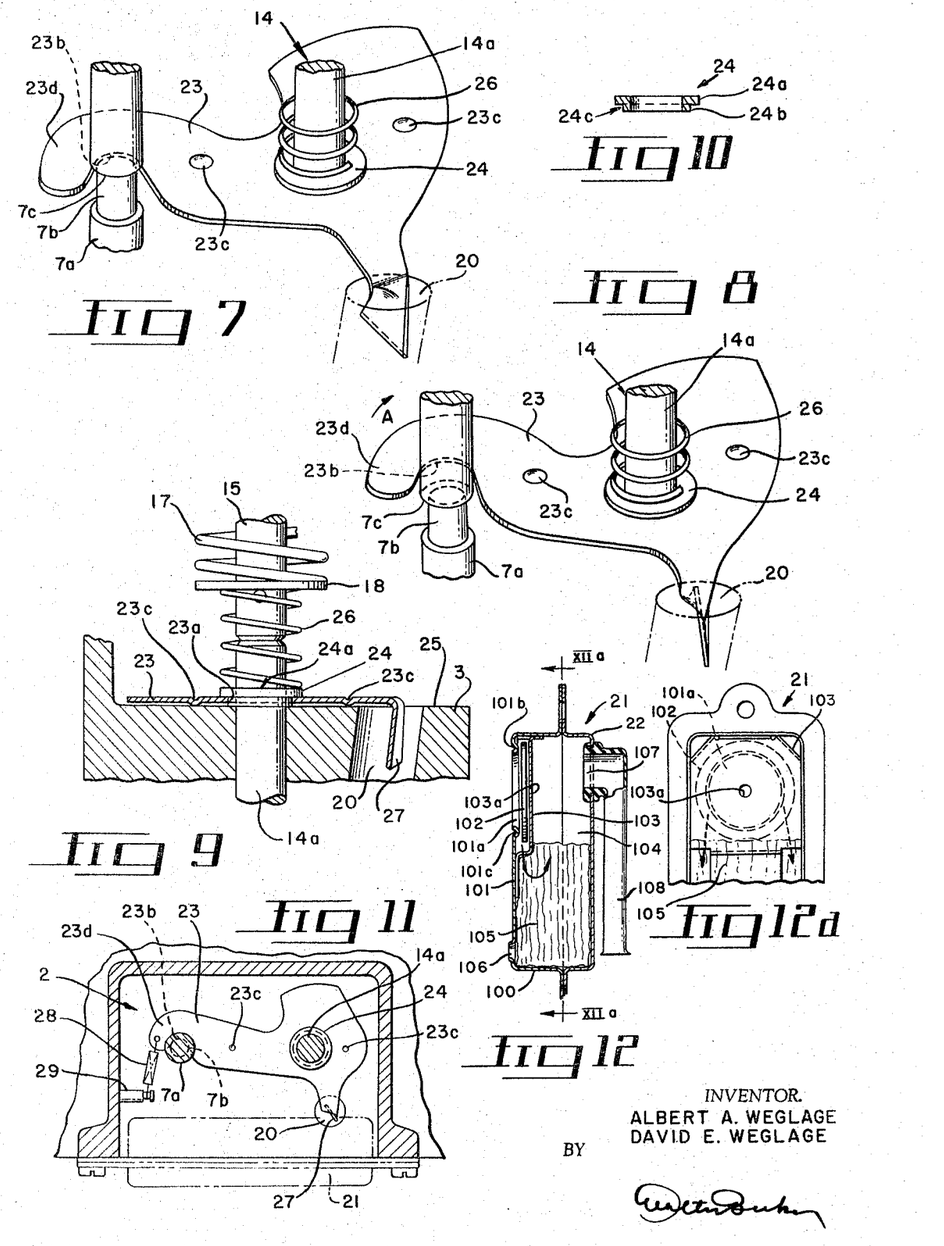
FIGURES 7 and 8 respectively illustrative perspective views of the compression release lever of the present invention in effective and ineffective positions.
FIGURE 9 illustrates a section along the line IX—IX of FIGURE 3.
FIGURE 10 illustrates a ring member for use in connection with the arrangement according to the present invention.
FIGURE 11 shows a modification of the compression release mechanism according to the invention for use in connection with a vertical arrangement of the lifter and valve shanks.
FIGURE 12 diagrammatically illustrates a breather as it may be used in connection with the present invention.

As will be evident from the drawings, especially FIGS. 7 and 8, lever 23 is provided with a fin 27 which extends into the passage 20 in such a way that the air pumped through the passage 20 will impinge upon said fin 27 in such a direction as to swing lever portion 23d away from the respective lifter member, in this instance lifter shank 7a, in other words, to swing control lever 23 in the direction of the arrow A to thereby cause lever 23 to disengage the neck portion 7b and move it out of the range of the collar surface 7c. To this end, fin 27 is somewhat propeller-like twisted, as is clearly indicated in FIGS. 7 and 8. This twist is preferably such that when the engine is running normally, the fin occupies a position in which it subdivides the adjacent mouth of passage 20 into approximately two equal sections. This prevents control lever 23 from fluttering.

Figure 2:
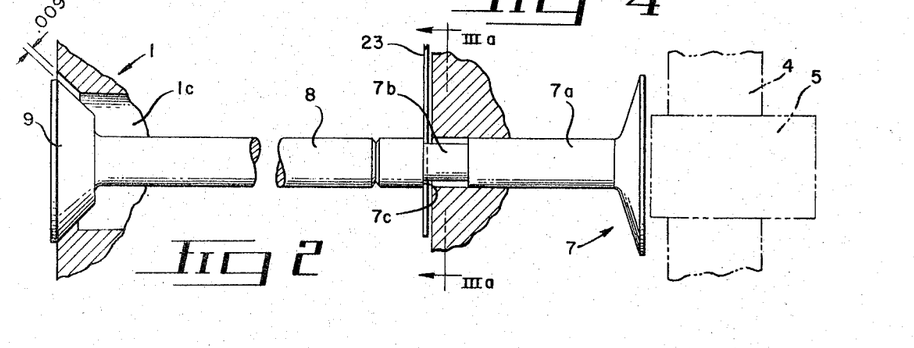
FIGURE 2 shows the partially held open exhaust valve and the compression release lever of FIG. 1 on a considerably larger scale than that of FIGURE 1.

That portion of control lever 23 which is adapted to engage and disengage neck portion 7b has a corresponding cutout 23b, as is likewise clearly shown in FIGS. 7 and 8, so as to be able to engage the collar surface 7c when lever 23 engages neck portion 7b. This engagement represents the effective or compression release position of control lever 23 inasmuch as in this position of control lever 23, lifter shank 7a is prevented from fully returning to its deepest position in the crankcase 3, so that as long as control lever 23 engages the collar portion 7c of lifter shank 7a, valve 9 cannot fully close. The extent to which valve 9 is kept open when control lever 23 is in its effective position, i.e. engages the neck portion 7c may be, for example, within the range of from .005" to .020", and the location of the collar surface 7c is selected accordingly. Tests have proved that excellent results are obtained by locating the collar surface 7c so that when the control lever 23 is in its effective position, valve 9 will remain open by .009" (see FIG. 2).

Figure 3:
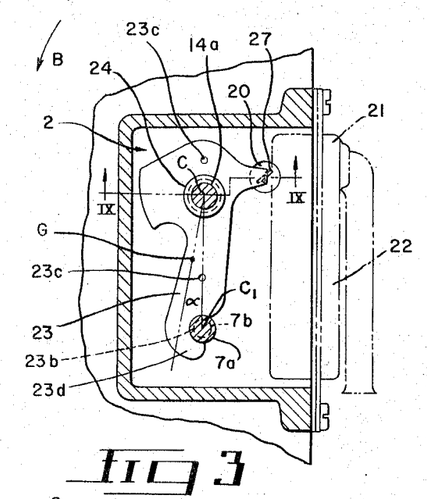
FIGURE 3 represents a section through FIGURE 1a along the line III—III thereof, the compression release lever occupying its effective or compression releasing position.
Figure 4:
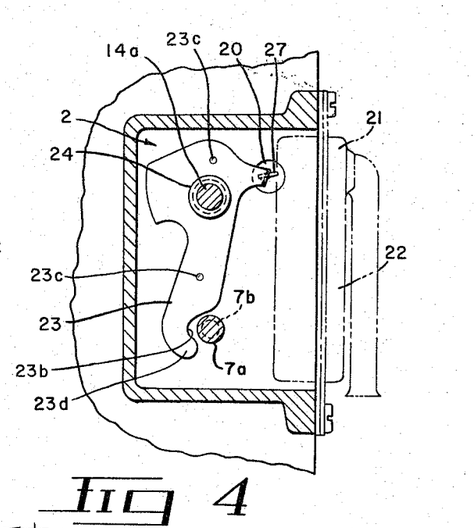
FIGURE 4 is a section similar to that of FIGURE 3 but with the compression release lever in an ineffective position.
Figure 4A:
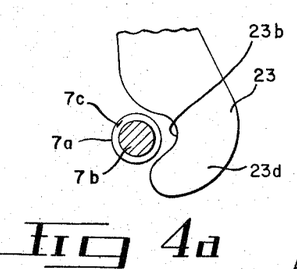
FIGURE 4a is a section similar to that of FIGURE 3a but with the compression release lever in an ineffective position.

The compression release mechanism according to the present invention has been described in connection with a horizontal engine in which the lifter members and valve shanks operated thereby extend in a horizontal or nearly horizontal plane. This makes the suspension or journalling of the control member 23 particularly simple since it can, and in the particular arrangement shown in FIGS. 3 and 4, is so suspended or pivotally mounted on lifter shank 14a that control member 23 is continuously urged by its own weight to engage lifter shank 7a and neck portion 7b thereof. In other words, when control member 23, or, more specifically, the fin 27 thereof, is not acted upon by a certain minimum air pressure conveyed through bore 20, control lever 23 will by gravity engage lifter shank 7a and eventually drop into the neck portion 7b below the collar surface 7c.

According to a particularly advantageous arrangement of the present invention, the control lever 23 is so designed that when the control lever 23 occupies its effective position shown in FIG. 3, the connecting line between the center C of its bore 23a (substantially located on the axis of lifter shank 14a) and the center C1 of its cutout 23b (in this position located substantially on the axis of lifter shank 7a) confines an angle α with the connecting line passing through the center of gravity (assumed to be located in point G) and the center C of bore 23a. This angle α may preferably vary from 20 to 30° but could, of course, be greater or smaller. Thus, if the engine were tilted from its FIG. 3 position in the direction of the arrow B by the angle α as it may occur, for instance, if a mower equipped with such engine were to be started on a corresponding slope, the control lever would still be in its effective position at the starting phase of the engine.

When an engine is employed in which the lifter shanks and corresponding valve shanks engaged thereby are vertically arranged so that when control member 23 is pivotally supported by a vertical lifter shank instead of the horizontal lifter shank 14a, control member 23 will, of course, not be urged into its effective position by gravity. In such an instance, a weak spring 28 (see FIG. 11) may be provided having one end connected to a stationary member, for instance, a pin 29 connected to a wall portion of the spring chamber 2. The other end of spring 28 may be connected to the portion 23d of lever 23. Weak spring 28 will in this way continuously urge the control lever 23 to its effective position. Control lever 23 will then be moved out of its effective position by the air pressure in passage 20 as soon as the air pressure overcomes the thrust of said weak spring 28.

*Operation*

Figure 3A:
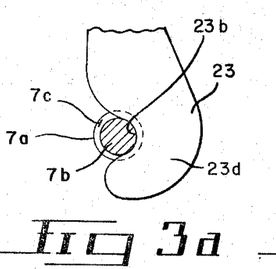
FIGURE 3a shows a section along the line IIIa—IIIa of FIGURE 2.

It may be assumed that the engine, a portion of which is shown in the drawing and which by way of example is assumed to be a single-cylinder lawn mower engine with horizontally extending lifter and valve shanks, is at a standstill. In this position the compression release or control lever 23 is in its FIGS. 2, 3 and 3a position in which the collar surface 7c of lifter 7 engages control lever 23. In this position the outlet valve 9 is kept slightly open, for instance by .009", which is assumed sufficient to effect a satisfactory compression release for the engine. When the crankshaft is now manually turned for starting the engine, for instance by means of a pulley connected to the crankshaft and a rope extending around the pulley, as is standard in numerous lawn mower engines, at the initial starting phase of the engine no gaseous flow occurs from the crank-case to the spring chamber through passage 20 which would be able, by acting on fin 27, to swing control lever 23 out of engagement with neck portion 7b and collar surface 7c. While the length of the neck portion 7b is sufficient to allow cam 5 to lift lifter 7 to its normal maximum and thereby to open the exhaust valve 9 to its normal maximum extent, control member 23 will at this time remain in its effective position so that valve 9 cannot fully close. However, as soon as the mixture in the cylinder is ignited and thereby the engine has been started, the said gaseous flow has developed so that by its action upon fin 27, it will swing control lever 23 out of engagement with lifter shank 7 and out of the range of the collar surface 7c. Control lever 23 will, therefore, now be in an ineffective position and will remain in this ineffective position as long as the engine is in normal operation and has at least its normal idling speed at which latter speed the necessary gaseous flow prevails in passage 20 for retaining lever 23 in its ineffective position.

However, as soon as the speed of the engine decreases below idling speed, i.e. is almost at a standstill, lever 23, due to its own weight, drops back into its effective position thereby again preventing valve 9 from fully closing and thus effecting the compression release when the engine is again being started.

While the compression release described so far has been described as controlling the exhaust valve 9, it is, of course, to be understood that the compression release according to the invention is not limited to the control of the outlet valve 9, although this is preferable, but may also be used instead in connection with the control of the inlet valve. In this instance the arrangement is, of course, precisely the opposite from what has been described, i.e. the lifter members 7 and 14 would be interchanged and the member 23 would be pivotally supported by the lifter operating the outlet valve.

Figure 18:
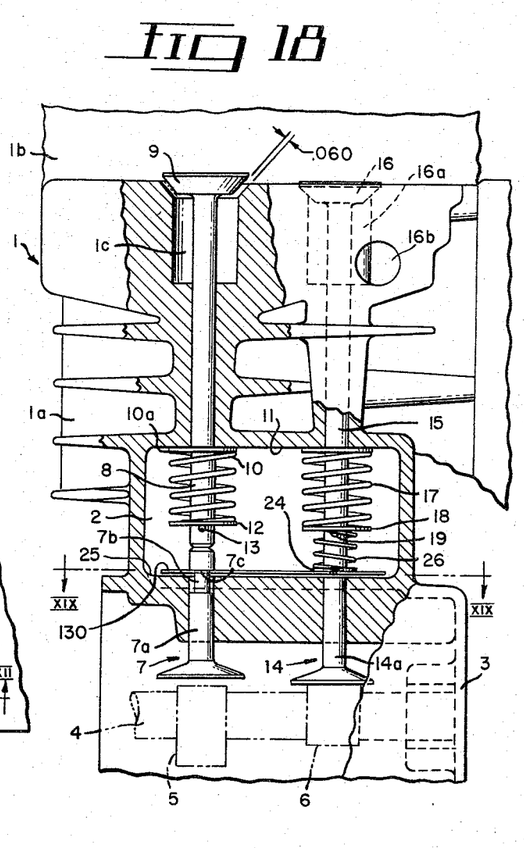
FIGURE 18 is a section and view similar to that of FIGURE 13 but with a modified compression release system according to the invention.
Figures 19, 20, 21, 22:
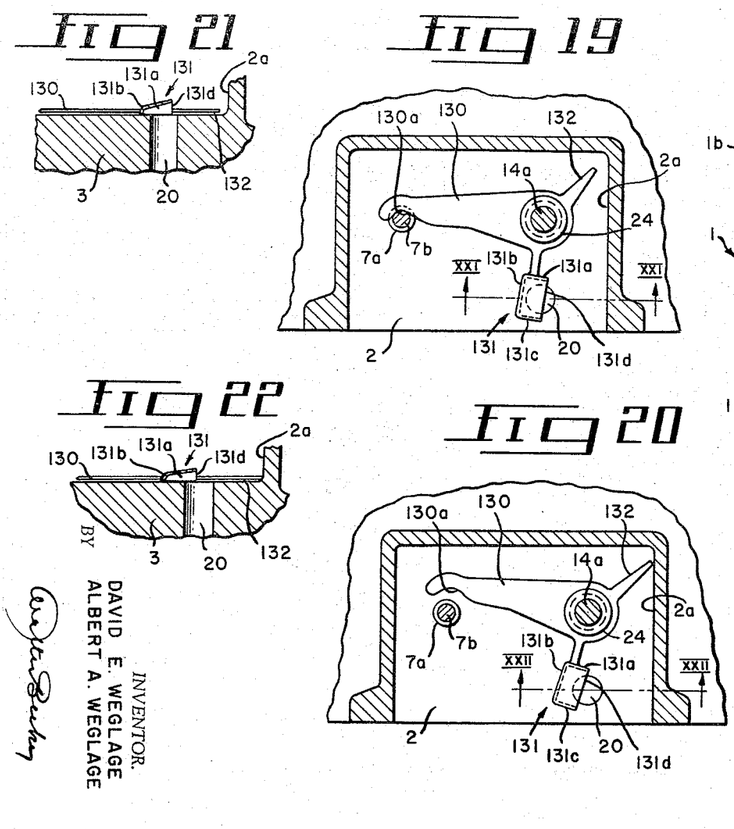
FIGURES 19 and 20 represent sections taken along the line XIX—XIX of FIGURE 18 but respectively showing the compression release lever in its effective and ineffec- positions.
FIGURE 21 is a section along the line XXI—XXI of FIGURE 19.
FIGURE 22 is a section taken along line XXII—XXII of FIGURE 20.

While the compression release mechanism of FIGS. 1 to 9 relies on gravity for its return to effective position, the arrangement of FIGS. 13 to 17 employs a light spring, whereas the arrangement of FIGS. 18 to 20 does not require a spring or any other specific additional element to return the control lever to its effective position.

Figure 13:
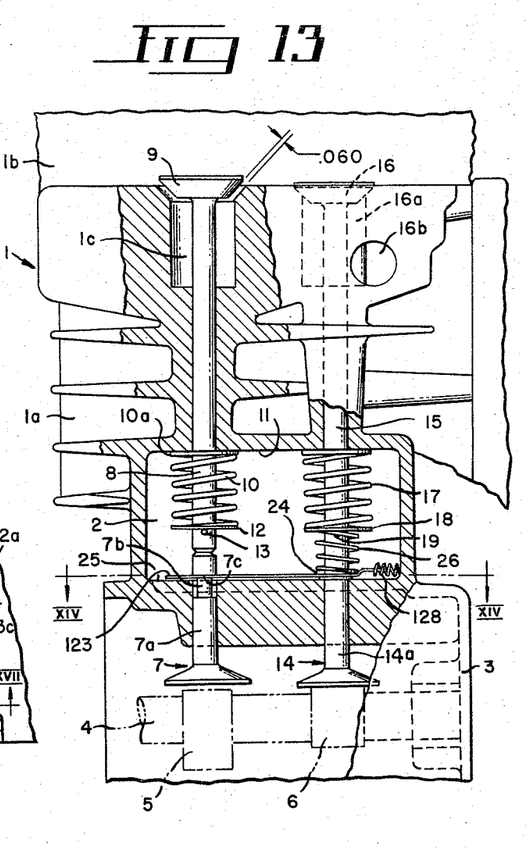
FIGURE 13 is a partial section through a cylinder block similar to that of FIG. 1a but with a modified control lever according to the invention.

Referring first to FIG. 13, this figure shows a section similar to that of FIG. 1a, and corresponding elements have been designated with the same reference numerals as in FIG. 1a, so that no further description of these elements appears to be necessary. Merely the passage 20 through which the gaseous flow passes from the crankcase into the spring chamber 2 is, according to the arrangement of FIG. 13 (in contrast to the arrangement of FIG. 1a), located in front of or before the drawing plane, as will be seen from FIGS. 14 and 15.

Furthermore, while also in this instance the length of the reduced diameter section 7b of shank 7a is in excess of the maximum possible stroke of valve 9 plus the thickness of control lever 123, the shape of the latter differs somewhat from the control lever 23 of the FIG. 1a arrangement. However, the basic principle of control lever 123 and its operation is the same as that of control lever 23. Also, the way control lever 123 is pivotally journalled about shank 14a is the same as described in connection with control lever 23 of FIG. 1a.

Referring now more specifically to control lever 123, this control lever has an arm 123b the free end of which is designed in the form of a flat, conically shaped cup 127 with the tip of the cup extending slightly into passage 20. Connected to arm 123b is a flat arm 123c carrying a small, light, preloaded spring 128 continuously urging lever 123 to move in a clockwise direction with regard to FIG. 14, one end of which rests on a collar 123d of arm 123c while the other end of said spring engages wall 2a of spring chamber 2.

Figures 14, 15, 16, 17:
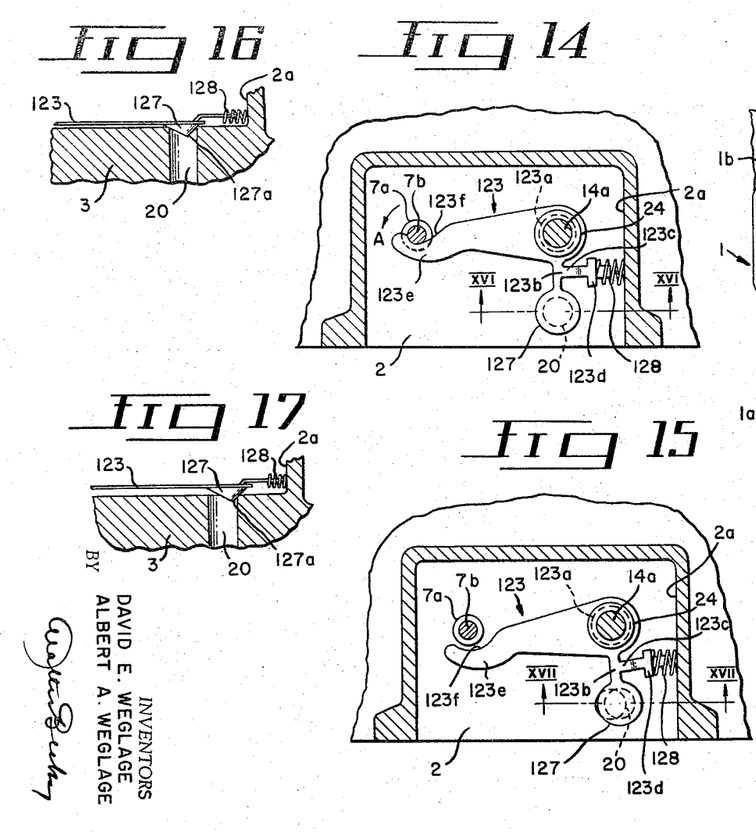
FIGURES 14 and 15 represent sections taken along the line XIV—XIV of FIGURE 13 but respectively showing the compression release lever in its effective and ineffective positions.
FIGURE 16 is a section taken along the line XVI—XVI of FIG. 14.
FIGURE 17 is a section taken along the line XVII—XVII of FIGURE 15.

That portion of lever 123 which is adapted to engage and disengage the neck portion 7b of lifter 7 has a corresponding cutout 123f, as is clearly shown in FIG. 15, so as to be able to engage the collar surface 7c when lever 123 engages neck portion 7b. This engaging position, which is shown in FIG. 14, represents the effective or compression release position of control lever 123 inasmuch as in this position of control lever 123, lifter shank 7a is prevented from fully returning to its deepest position in the crankcase 3 so that, as long as control lever 123 engages the collar portion 7c of lifter shank 7a, valve 9 cannot fully close. The extent to which valve 9 is kept open when control lever 23 is in its effective position may be within a wide range as, for instance, from .005″ to .060″, and the location of the collar surface 7c is selected accordingly. Tests have proved that excellent results are obtained by locating the collar surface 7c so that when the control lever 23 is in its effective position, valve 9 will remain open by approximately .040″ or .050″.

As will be seen from FIGS. 16 and 17, the tapering surfaces of the cup 127 are not uniform all around the cup but the taper on the left-hand side of the cup, with regard to FIGS. 16 and 17 is flatter than on the right-hand side, so that the air under pressure passing up the passage 20 and impinging upon the cup 127 will push the latter toward the right with regard to FIGS. 16 and 17. In other words, the arrangement is such that the gaseous flow during the normal running of the engine, including the idling period thereof through passage 20 will impinge upon said cup 127 in such a direction as to swing lever portion 123e away from the respective lifter shank, in this instance 7a, so that the control lever 123 will move in the direction of the arrow A, i.e. from its FIG. 14 position to its FIG. 15 position. In this way, the neck portion 7b of the lifter shank 7a is disengaged by control lever 123 and is moved out of the range of the collar surface 7c. This disengaging movement of the lever 123 causes spring 128 to be compressed slightly. However, the gaseous flow through passage 20 will, during the normal running operation of the engine including the idling of the engine, be such as to hold lever 123 out of engagement with the collar surface 7c. When the engine speed drops below idling speed and the said gaseous flow subsides, the force of compressed spring 128 will swing lever 123 back into its effective position shown in FIG. 14.

*Operation of the embodiment of FIGS. 13 to 17*

It may be assumed that the engine of FIG. 13, which, by way of example is assumed to be a single-cylinder engine with vertically extending lifter and valve shanks, is at a standstill. In this position, the compression release of control lever 123 is in its FIG. 14 position in which the collar surface 7c of lifter 7 engages control lever 123. In this compression release position the outlet valve 9 is kept slightly open to an extent sufficient to effect a satisfactory compression release for an engine of the assumed type. As a matter of fact, with valve 9 open by .060″ this compression release is approximately the same as if the sparkplug had been removed. It is to be understood that while the length of the neck portion 7b is sufficient to allow cam 5 to lift the lifter 7 to its normal maximum extent and thereby to open the exhaust valve 9 to its normal maximum extent, control lever 123 in its effective compression release position will prevent valve 9 from fully closing, i.e. as mentioned above, will keep valve member 9 open, for instance by .060″. When the crank-shaft is now turned, for instance manually, for starting the engine, for example by means of a pulley connected to the crank-shaft and a rope extending around the pulley, a gaseous flow from the crankcase to the spring chamber through passage 20 develops quickly and moves lever 123 in counter-clockwise direction with regard to FIGS. 14 and 15 so as to move lever 123 from its effective position of FIG. 14 to its ineffective position of FIG. 15. As will be seen from a comparison of FIG. 16 with FIG. 17, the cup 127, when moving from its effective to its ineffective position, climbs slightly upwardly along its edge 127a, while spring 128 is somewhat compressed. The momentum which the movable components of the engine gain during the initial starting phase, in view of the fact that valve 9 at the very start of the starting operation was held relatively wide open by the compression release lever 123, is fully sufficient to move the piston through its compression stroke, and as a rule, the engine will fire. This means that the gaseous flow from the crankcase to the spring chamber will further increase and will be more than sufficient to hold lever 123 in its ineffective position.

However, if the engine should not fire, the speed of the piston will immediately decrease and consequently, the gaseous flow in passage 20 will drop to such an extent that the thrust of spring 128 will return lever 123 to its effective position, as shown in FIG. 14. The engine may then again be started with the compression release fully effective as before. Similarly, when, after running the engine for a period of time, the latter is turned off, spring 128 will, shortly before the engine comes to a standstill, return control lever 123 to its effective position. In this way, the compression release is always effective when the engine is to be started without requiring any linkage system for actuating the compression release. Similarly, the compression release becomes ineffective as soon as the engine has been started and remains ineffective throughout the normal operation of the engine including its idling phase, so that there will absolutely be no compression loss during the normal operation of the engine, and the engine will operate as if there were no compression release at all present.

*Modification of FIGS. 18 to 22*

As has been set forth above in connection with the description of the embodiment of FIGS. 13 to 17, lever 123 is, at a decrease of the engine speed below idling speed, moved back into its effective position by spring 128. In an effort to eliminate spring 128 and further to simplify the operation of the control lever, applicants have found that when the piston or pistons of an internal combustion engine reciprocate below a certain speed lower than normal idling speed, a suction effect is created in spring chamber 2 and passage 20. In this connection, it should be remembered that breather plate 102 (FIG. 12) permits air from spring chamber 2 to pass into the atmosphere but not vice versa. On the basis of this finding the lever 123 of FIGS. 1 to 5 has, in conformity with a further development of this invention, been simplified to the design shown in FIGS. 18 to 22. As will be noted from these figures, control lever 130 is no longer provided with a cup 127 opening away from the passage 20 but instead is provided with a cup 131 opening toward passage 20. This cup 131 is rather flat, similar to a pan. Member 131 may, due to its shape and also due to its functional similarity to an air foil, be designated as "air foil member." Furthermore, in distinction from the embodiment shown in FIGS. 13 to 17, the member 131 does not extend into the passage 20 but is arranged slightly thereabove. As will furthermore be seen from the drawing, especially FIGS. 19 to 22, the flat pan-shaped member 131 has its edges at three sides turned downwardly at approximately 90°, namely, 131a, 131b and 131c, whereas the fourth side 131d is open. Furthermore, member 131 is inclined downwardly in a direction away from the open side 131d, as is particularly clearly shown in FIGS. 21 and 22. It will also be noted especially from FIG. 19 that when lever 130 is in its effective position, member 131 is located toward one side of passage 20 and, more specifically, to the left-hand side with regard to FIG. 19 so that the gaseous flow from the crankcase to the spring chamber through passage 20 will impact upon member 131 and swing lever 130 in clockwise direction with regard to FIG. 19 thereby moving lever 130 from its effective position shown in FIG. 19 to its ineffective position shown in FIG. 20. In order to limit this movement of lever 130, lever 130 is provided with a stop arm 132 which, when the cutout 130a has sufficiently cleared shoulder 7c of lifter 7a, will engage the wall 2a of spring chamber 2 thereby stopping the movement of lever 130 in clockwise direction with regard to FIGS. 19 and 20.

The engagement and disengagement of lever portion 130a with the collar surface 7c is precisely the same as that described above in connection with the embodiment of FIGS. 13 to 17.

*Operation of the embodiment of FIGS. 18 to 22*

It may again be assumed that the engine of FIG. 18 is at a standstill and that the control lever 130 is in its effective position (FIG. 7) in which it engages the reduced portion 7b and the collar area 7c. If now, the crankshaft is turned for starting the engine, for instance by a pulley and a rope therearound, the quickly occurring gaseous flow from the crankcase to the spring chamber through passage 20 moves lever 130 in clockwise direction with regard to FIG. 19 so as to move lever 130 from its effective position of FIG. 19 to its ineffective position of FIG. 20. The momentum which the movable components of the engine gain during the initial starting phase, in view of the fact that valve 9 at the very start of the starting operation was held relatively wide open by the compression release lever 130, is fully sufficient to move the piston through its compression stroke, and as a rule, the engine will fire. This means that the piston will move at an even higher speed, and the gaseous flow in passage 20 will be more than sufficient to hold lever 130 in its ineffective position. The movement of lever 130 into its ineffective position is limited by the engagement of arm 132 with the wall 2a of the spring chamber.

If, however, the engine should not fire, the speed of the piston will immediately decrease so that the atmospheric pressure acting on member 131 is greater than the pressure in passage 20. This pressure difference, or, expressed differently, the thus created suction effect in passage 20 causes member 131 immediately to move back to its effective position in which it again holds valve 9 open in compression release position, and now the starting may be repeated with the compression release fully effective under the same favorable conditions as before. It will be appreciated that the last-mentioned condition also prevails shortly before the piston comes to a standstill following the running period of the engine, so that at any time when the engine is at a standstill, the compression release lever 130 is in its effective position.

*Embodiment of FIGS. 23 to 27*

Figures 23, 24, 25, 29, 30, 31:
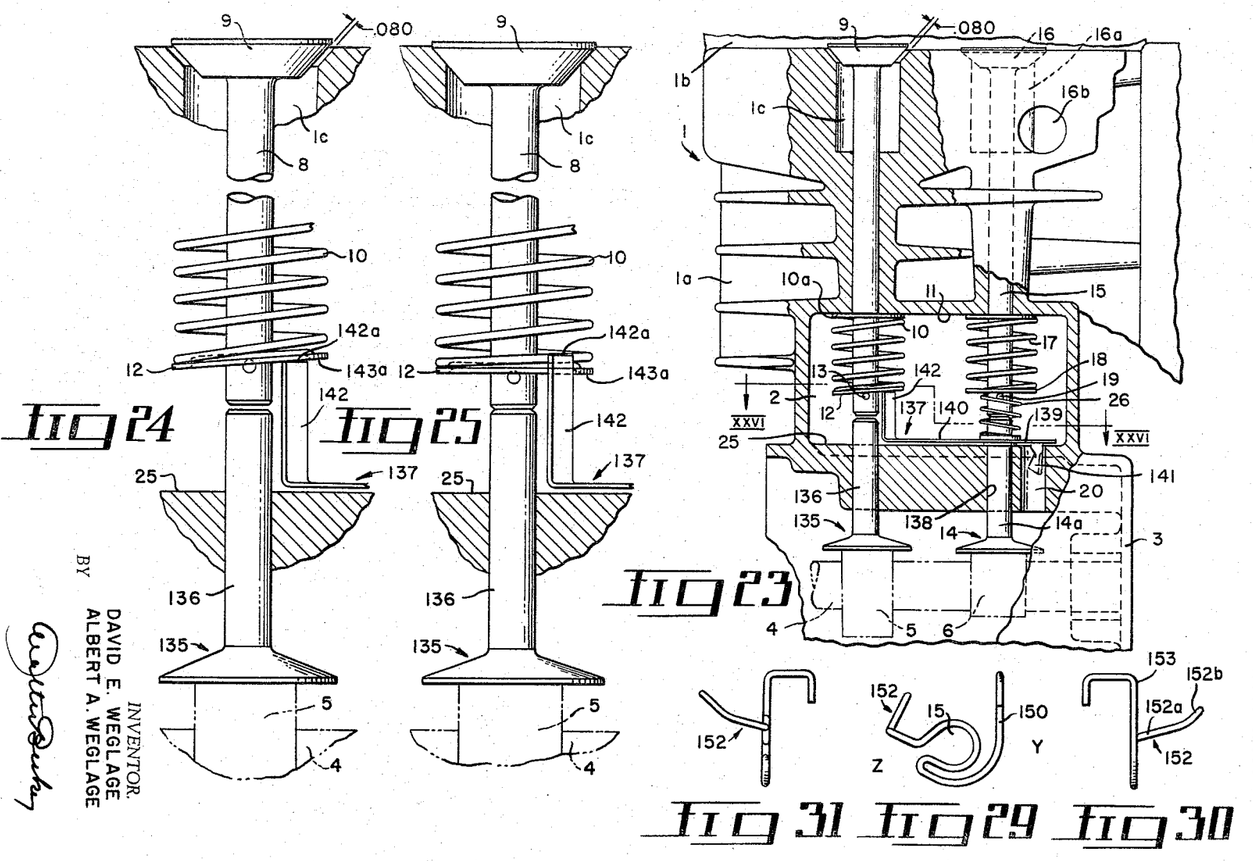
FIGURE 23 is a partial section through a cylinder block similar to FIGS. 1a and 13 but with a modified and greatly simplified compression release system.
FIGURE 24 shows the modified compression release mechanism of FIGURE 23 but in its effective position, and on a larger scale than the latter.
FIGURE 25 is a showing similar to FIGURE 24 but with the compression release in its ineffective position.
FIGURE 29 is a top view of a compression release lever which, while basically following the principle of the control lever shown in FIGS. 23 to 27, is somewhat differently shaped over the control lever of FIGS. 23 to 27 and is made of a single piece of wire.
FIGURE 30 is a side view of FIGURE 29 as seen in the direction of the arrow Y in FIGURE 29.
FIGURE 31 is a side view of FIGURE 29 as seen in the direction of the arrow Z in FIGURE 29.

Referring now to the arrangement of FIGS. 23 to 27, most of the parts shown therein correspond to those referred to in connection with FIGS. 1a to 22, and, therefore, corresponding elements in FIG. 23 have been designated with the same reference numerals as in FIGS. 1a to 27. The primary difference between the arrangement of FIGS. 23 to 27 and the arrangements in the preceding figures consists in the way in which the respective valve is being held open during the compression release phase. More specifically, while in the arrangements of FIGS. 1a to 22 the lifter shank 7a is provided with a groove 7b and a shoulder 7c to be engaged by control lever 123, lifter 135 has a groove-free shank 136. Furthermore, control lever 137 does not engage lifter 136 at all but instead, for purposes of holding the respective valve in its compression release position, lifts the stem 8 of exhaust valve 9.

With specific reference to FIGS. 23 and 26, the control lever 137 shown therein is, similar to the control levers of the preceding embodiments, provided with a bore 138 by means of which lever 137 is pivotable about the intake valve stem 15. In more detail, the pivotal arrangement for lever 137 may be the same as described in connection with FIGS. 1a, 7 and 10. Lever 137 has one arm 139 and a second arm 140. The shorter arm 139 has at its outer end connected thereto an extension 141 which extends into bore 20, establishing communication between the interior of crankcase 3 and spring chamber 2. In the particular showing of FIG. 23, extension 141 forms a blade which is not twisted but the plane of which relative to the plane of arm 139 is such that the gaseous flow from crankcase 3 through passage 20 into spring chamber 2 will pivot control lever 137 in counter-clockwise direction with regard to FIG. 26, i.e. in the direction of the arrow A.

Lever arm 140, which is the longer lever arm, has at its outer end an upwardly extending extension 142. This extension 142 has a height which is in excess of the distance between the spring chamber bottom 25 and the bottom surface 143 of spring keeper 12 when valve 9 is in its closed position and control lever 137 is in its ineffective position shown in FIGS. 25 and 26. When control lever 137 is in its ineffective position, extension 142 is out of the range of spring keeper 12, which means that control lever extension 142 is arranged outside the peripheral area of spring keeper 12, as is shown in FIGS. 25 and 7. From FIG. 25 it will be seen that in this position, the free edge 142a of lever extension 142 is located in a plane above spring keeper 143. When control lever 137 is in its effective position so as to effect a compression release, as shown in FIGS. 24 and 26, the free edge 142a of lever extension 142 engages the bottom surface 143a of spring keeper 12 so as to tilt the same, as shown in FIG. 24, and thereby lifts valve 9 to the desired extent for the compression release, for instance by .080".

*Operation of the embodiment of FIGS. 23 to 27*

It may be assumed that the engine of FIG. 23 is at a standstill. In this position the compression release or control lever 137 is in its FIG. 23 and FIG. 24 position in which lever extension 142 is below spring keeper 12 and while tilting the same keeps valve 9 open to an extent sufficient to effect a satisfactory compression release for an engine of the assumed type.

When the crank-shaft of the engine is now turned, for instance in the same manner as described in connection with the preceding embodiments, a gaseous flow from the crankcase to the spring chamber through passage 20 quickly develops and urges control lever 137 in counter-clockwise direction, as indicated by the arrow A in FIG. 27, so that when cam 5 pushes lifter 7 upwardly and thereby also shank 8 with keeper 12 resting on pin 13, extension 142 is disengaged by keeper 12 and the air pressure in passage 20 acting on extension 141 pivots lever 137 so as to move extension 142 out from below spring keeper 12 and permits valve 9 to operate in the normal manner.

The momentum which the moveable components of the engine gain during this initial starting phase, in view of the fact that valve 9, at the very start of the starting operation, was held relatively wide open by the compression release lever 23, is fully sufficient to move the piston through its compression stroke, and as a rule, the engine will fire. The engine will then move at an even higher speed, and the gaseous flow in passage 20 will be more than sufficient to hold lever 137 in its ineffective position. However, should the engine not fire, the speed of the piston will immediately decrease, and consequently, the said gaseous flow in passage 20 will drop to such an extent that sufficient suction will occur in passage 12 to pull lever arm 139 and thereby lever 137 into its effective position as soon as valve shank 8 has been lifted by lifter 7 to such an extent that lever extension 142 can slip underneath spring keeper 12. This allows the control lever to return to its effective position even if the engine is an upright engine. If the engine is a horizontal engine, valve lever 137 will be aided by gravity to return to its effective or compression releasing position in the same manner as described above in connection with the embodiment of FIG. 1a.

It will be appreciated that the automatic movement of control lever 137 to its effective position from its ineffective position, as just described, will also occur when the engine, after a running period, is deliberately turned off.

It may be added that normally, when control lever 137 is in its ineffective position, spring keeper 12 has approximately a slide fit on shank 8 and can easily ride thereon. However, when spring keeper 12 is titled, as shown in FIG. 24, which occurs when control lever 137 is in its effective position, spring keeper 12 is locked to shank 8 and thus valve extension 142 is able to prevent valve shank 8 through spring keeper 12 from fully closing, in other words, lever extension 142 then keeps valve 9 in its compression release position. If the engine should not have started during the first starting attempt, the starting operation will, of course, have to be repeated.

*Modification according to FIG. 28*

FIG. 28 shows a valve-lifter arrangement which differs from the valve-lifter arrangements in FIGS. 23 to 25 in that the free end of valve 9a has its shank 8a provided with a shoulder 144 adjacent an undercut section 8b in valve shank 8a, spring keeper 142 is of the well-known type with a keyhole 146 therein, as illustrated in FIG. 32. It will be appreciated that in order to mount spring keeper 145 on valve shank 8a, shoulder 144 is passed through the wider portion of keyhole 146 whereupon spring keeper 145 is moved eccentrically so that the annular portion of said keyhole engages the undercut portion 8b. A spring ring 147 is interposed between spring keeper 145 and shoulder 144.

Shoulder or collar member 144 is engaged by an auxiliary washer 148 with slide fit. This washer is held on shoulder member 144 by means of an auxiliary spring 149 the lower end of which rests on the spring chamber bottom 25.

The operation of the arrangement of FIG. 28 is very similar to that of FIGS. 23 to 27. It will be appreciated that control lever extension 142 will cooperate with auxiliry washer 148 in precisely the same manner as lever extension 142 does with the spring keeper 143, in the arrangement of FIGS. 23 to 27. When auxiliary washer 148 is titled by lever extension 142 engaging the same from below, auxiliary washer 148 is locked to valve 9a through the shoulder portion 144.

While the control lever 137 according to the embodiment of FIGS. 23 to 28 is formed from a sheet metal piece, according to a particularly simplified further development of the control lever, the control lever may be bent from a single wire piece. Such a control lever is shown in FIGS. 29 to 31 and designated with the reference numeral 150. This control lever 150 has a central opening 151 by means of which it is pivoted, for instance, on the shank of the inlet valve in the same manner as the aforementioned control levers have been pivoted on the shank of the inlet valve. The lever portion of lever 150 which corresponds to the extension 141 extending into passage 20, as shown in FIG. 23, is represented by the portion 152 which has two sections 152a and 152b forming a slight angle with regard to each other in such a way that when portion 152 is impacted upon by the gaseous flow passing from the crankcase through passage 20 into the spring chamber, lever 151 will be pivoted in the same manner and for the same purpose as described in connection with lever 137 of FIGS. 26 and 27. Portion 153 of lever 150 corresponds to and serves the same purpose as the extension 142 of lever 137.

It is, of course, to be understood that the present invention is, by no means limited to the particular embodiments shown in the drawings, but also comprises any modifications within the scope of the appended claims. Thus, while the compression release according to the present invention has been described as controlling the exhaust valve 9, it is, of course, to be understood that it is not limited to the control of the exhaust valve 9, although this is preferable, but may also be used instead in connection with the inlet valve. In this instance, the arrangement is precisely the opposite from what has been described, i.e. the lifter members 7 and 14 or 135 and 14 would have to be interchanged, and the control lever would be pivotally supported by the lifter operating the outlet valve.

It may further be mentioned that while the diameter of passage 20 may vary with various designs, as mentioned above, merely by way of example, it has been found that with a piston diameter of 2½" in a one-cylinder engine, a diameter of passage 20 of 5/16" has proved highly successful in connection with the present invention.

What we claim is:

1. In an internal combustion engine having a cylinder with a port, a piston reciprocable in said cylinder, a crankcase communicating with said cylinder, a chamber, conduit means establishing communication between said crankcase and said chamber, and means to vent said chamber: valve means extending into said chamber, cam shaft means drivingly connected to said piston and operable to control said valve means so as to cause the same alternately to open and close said port, spring means continuously urging said valve means into said port closing position, and a control lever pivotally arranged in said chamber and operable shortly before said engine comes to a stop to move into a first position in which it prevents said valve means from moving into said port closing position, said control lever having an arm adjacent the opening through which said conduit means leads into said chamber so as to be impinged upon and movable by gaseous flow from said crankcase to said chamber at engine idling speed and above to move said control lever out of said first position into a second position to permit normal operation of said valve means.

2. In an internal combustion engine having a substantially horizontal cylinder with a port, a piston reciprocable in said cylinder, a crankcase communicating with said cylinder, a chamber, conduit means establishing communication between said crankcase and said chamber, and means operable to vent said chamber: valve means extending into said chamber, cam shaft means drivingly connected to said piston and operable to control said valve means so as to cause the same alternately to open and close said port, said valve means including a lifter member operable by said cam shaft means and also including a valve member movable by said lifter member into port opening position, said valve member and said lifter member having their longitudinal axes extending in substantially axial alignment and in a substantially horizontal plane, spring means arranged in said chamber and continuously urging said valve member into its port closing position, and a control lever pivotally arranged in said chamber and having its pivot axis arranged at a level higher than the axis of said valve means, said control lever being operable automatically by gravity to move into a first position in which it prevents said valve means from moving into said port closing position, said control lever having an arm adjacent the opening through which said conduit means leads into said chamber so as to be impinged upon and movable by gaseous flow from said crankcase to said chamber at engine idling speed and above, to move said control lever out of said first position into a second position to permit normal operation of said valve means.

3. In an internal combustion engine having a substantially horizontal cylinder with a port, a piston reciprocable in said cylinder, a crankcase communicating with said cylinder, a chamber, conduit means establishing communication between said crankcase and said chamber, and means to vent said chamber: valve means extending into said chamber, cam shaft means drivingly connected to said piston and operable to control said valve means so as to cause the same alternately to open and close said port, said valve means including a lifter member operable by said cam shaft means and also including a valve member movable by said lifter member into port opening position, said valve member and said lifter member having their longitudinal axes extending in substantially axial alignment and in a substantially horizontal plane, spring means arranged in said chamber and continuously urging said valve member into said port closing position, and a control lever pivotally arranged in said chamber and having its pivot axis arranged at a level higher than the axis of said valve means, said control lever being operable automatically by gravity to move into a first position in which it prevents said valve means from moving into said port closing position, said control lever having an arm with a portion thereof extending into said conduit means and being operable by gaseous flow from said crankcase to said chamber at engine idling speed and above to move said control lever out of said first position into a second position to permit normal operation of said valve means.

4. In an internal combustion engine having a cylinder with an inlet port and an outlet port, a piston reciprocable in said cylinder, a crankcase communicating with said cylinder, a chamber, conduit means establishing communication between said crankcase and said chamber, and means to vent said chamber: two valve means extending into said chamber and respectively being operable to move into positions for opening and closing said ports, cam shaft means drivingly connected to said piston and operable to control said two valve means so as to cause the same alternately to open and close their respective ports, each of said valve means including a lifter member extending into said crankcase for engagement with said cam shaft means and operable by said cam shaft means and also including a valve member movable by the respective adjacent lifter member into port opening position, spring means arranged in said chamber and respectively associated with said two valve means for continuously urging the same into their port closing positions, and a control lever pivotable about the lifter member of one of said valve means and having a first arm pivotable into a first position for preventing the valve member of the other valve means from moving into its port closing position, said control lever also having a second arm operable by gaseous flow from said crankcase to said chamber at engine idling speed and above to move said first arm out of said first position into a second position to permit normal operation of said valve means, said second arm having a portion thereof adjacent the opening by which said conduit means leads into said chamber so as to be impinged upon by said gaseous flow passing through said conduit means.

5. An arrangement according to claim 4, in which said internal combustion engine is a horizontal engine, and in which the first arm of said control lever is urged by gravity into its first position.

6. In an internal combustion engine having a cylinder with an inlet port and an outlet port, a piston reciprocable in said cylinder, a crankcase communicating with said cylinder, a chamber, conduit means establishing communication between said crankcase and said chamber, and means for venting said chamber: two valve means extending into said chamber and respectively being operable to move into positions for opening and closing said ports, cam shaft means drivingly connected to said piston and operable to control said two valve means so as to cause the same alternately to open and close their respective ports, each of said valve means including a lifter member extending into said crankcase for engagement with said cam shaft and operable by said cam shaft means and also including a valve member movable by the respective adjacent lifter member into port opening position, spring means arranged in said chamber and respectively associated with said two valve means for continuously urging the same into their port closing positions, and a control lever pivotable about the lifter member of the other of said valve means and having a section thereof extending into said chamber and provided with a shoulder, said control lever having a first arm pivotable into engagement with that surface of said shoulder which faces toward said cam shaft for preventing said last-mentioned lifter member from completely returning to its deepest penetration into said crankcase to thereby prevent the respective adjacent valve member from moving into its port closing position, said control lever also having a second arm with a portion thereof arranged adjacent the opening through which said conduit means communicates with said chamber so as to cause gaseous flow passing through said conduit means to impinge upon said portion, said portion being operable in response to gaseous flow from said crankcase to said chamber at engine idling speed and above to move said first arm out of engagement with said shoulder to thereby permit normal operation of the valve member pertaining to said shoulder equipped lifter member.

7. An arrangement according to claim 6, in which said engine is a horizontal engine, and in which said first arm of said control lever is continuously urged by gravity to move to its shoulder engaging position.

8. An arrangement according to claim 4, in which the lifter member about which said control member is pivotable is surrounded by a ring member pivotally engaged by said control member, and spring means extending around said last-mentioned lifter member and urging said ring means against that wall portion of said chamber which is adjacent said control lever.

9. In an internal combustion engine having a cylinder with a port, a piston reciprocable in said cylinder, a crankcase communicating with said cylinder, a chamber, conduit means establishing communication between said crankcase and said chamber, and means for venting said chamber: valve means extending into said chamber, cam shaft means drivingly connected to said piston and operable to control said valve means so as to cause the same alternately to open and close said port, said valve means including a lifter member operable by said cam shaft means and extending into said chamber through a first wall, said valve means also including a valve member having a portion extending into said chamber through a second wall opposite said first wall and being movable by said lifter member to move said valve member into port closing position; dish means surrounding said valve member portion in said chamber and arranged in spaced relationship to said first wall, spring means supported by said dish means and arranged in said chamber between said second wall and said dish means, holding means holding said dish means on said valve member against the thrust of said spring means, said spring means through the intervention of said dish means and said holding means continuously urging said valve member into its port closing position, and a control lever pivotally supported in said chamber adjacent said first wall and having a first arm with a portion thereof extending into said conduit means and having a second arm with an extension extending in the direction of said valve means, said extension having a length exceeding the distance between said dish means and said first wall when said dish means is closed to said first wall, said length being less than the distance between said first wall and said dish means when the latter has its greatest distance from said first wall, said portion of said first arm which extends into said conduit means being operable in response to gaseous flow from said crankcase to said chamber at engine idling speed and above to pivot said extension into and hold the same in a position outside said dish means, said extension being operable automatically in response to the subsiding of said last-mentioned gaseous flow to move below said dish means to thereby prevent said valve member from moving into its port closing position.

10. An arrangement according to claim 9, in which said engine is a horizontal engine, and in which the pivotal axis of said control lever is located in a plane higher than said valve means, said extension being continuously urged by gravity to move between said first wall and said dish means.

11. An arrangement according to claim 9, in which said control lever consists of a bent flat sheet metal section having a width greater than its thickness, that wider portion of said lever which is located between its pivotal axis and said extension being substantially parallel to said first wall.

12. An arrangement according to claim 9, in which said control lever consists of a piece of bent wire.

13. An arrangement according to claim 9, in which that portion of said valve member which is adjacent said lifter member has an undercut portion and an adjacent shoulder portion, and in which said dish means includes a spring keeper surrounding said undercut portion and being engaged by that portion of said spring means which is remote from said second wall, said dish means also including washer means surrounding said shoulder portion, and auxiliary spring means interposed between said first wall and said washer means.

14. In connection with an internal combustion engine having a reciprocable piston, which comprises a valve and a control member operable to prevent said valve from fully closing during the starting phase of said engine, and which also comprises a crankcase and a chamber communicating with said crankcase through conduit means through which during operation of said engine a gaseous flow passes from said crankcase into said chamber, the method of employing the gaseous flow from said crankcase to said chamber for moving said control lever into and holding said control lever in an ineffective position to thereby permit normal operation of said valve at engine idling speed and above.

15. As a new article of manufacture; a compression release control lever for use in connection with a reciprocable piston equipped four stroke cycle internal combustion engine having a crankcase and a chamber communicating with said crankcase and also having means for venting said chamber, which has a first arm and a second arm and a bore for receiving pivot means, said first arm having a portion operable to act upon the reciprocable valve means of an engine of the above mentioned type so as to prevent said valve means from closing its valve port, and said second arm being operable by a gaseous flow from said crankcase to said chamber at engine idling speed and above to move said first arm into an inactive position.

16. As a new article of manufacture: a compression release control lever for use in connection with a reciprocable piston equipped four stroke cycle internal combustion engine having a crankcase and a chamber communicating with said crankcase and also having means for venting said chamber and in which during engine operation a gaseous flow passes from said crankcase to said chamber, which comprises a first arm and a second arm and an opening between said arms for receiving pivot means, said first arm having an extension extending approximately in a plane transverse to the plane through said two arms, said second arm also having an extension extending approximately along a plane transverse to the plane passing through said two arms but in a direction opposite to the direction in which said first mentioned extension extends.

17. An article according to claim 16, which consists of a piece of wire.

18. An article according to claim 15, which includes a third arm and spring means arranged on said third arm and protruding therebeyond.

19. As an article of manufacture: a control lever according to claim 15, in which said first arm has an approximately semicircular cut-out, and in which said second arm is provided with a vane.

20. An article according to claim 15, which has a third arm forming a stop member for engagement with a wall of a spring chamber of a four stroke cycle internal combustion engine.

References Cited by the Examiner

UNITED STATES PATENTS

| | | | |
|---|---|---|---|
| 854,035 | 5/1907 | Hansen-Ellehammer | 123—182 |
| 2,323,304 | 7/1943 | Bowman | 123—182 |

FOREIGN PATENTS 376,490 7/1932 Great Britain.

MARK NEWMAN, *Primary Examiner.*
CARLTON R. CROYLE, *Examiner.*
L. M. GOODRIDGE, *Assistant Examiner.*